US006292737B1

(12) United States Patent
Higashimata et al.

(10) Patent No.: US 6,292,737 B1
(45) Date of Patent: Sep. 18, 2001

(54) PRECEDING VEHICLE FOLLOW-UP CONTROL SYSTEM

(75) Inventors: Akira Higashimata; Takenori Hashizume, both of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/573,999

(22) Filed: May 19, 2000

(30) Foreign Application Priority Data

May 25, 1999 (JP) ................................................. 11-144975

(51) Int. Cl.[7] ............................. B60T 7/00; B60T 8/00; G05D 1/00; G05D 15/00; G05D 13/00; G06F 7/00; G06F 17/00; G06F 19/00
(52) U.S. Cl. .................................... 701/96; 83/85; 83/90; 83/93; 83/301; 180/179; 180/170; 180/178; 180/169; 180/167; 180/174; 340/435; 340/903; 340/904; 340/906; 340/901; 340/436; 342/70; 342/71; 342/115; 342/90; 342/456
(58) Field of Search ................................. 701/96, 93, 90, 701/83, 85, 301; 303/3, 192, 125, 193; 180/179, 170, 178, 169, 167, 174; 340/435, 903, 904, 906, 901, 436; 342/70, 71, 115, 90, 456

(56) References Cited
U.S. PATENT DOCUMENTS 3,725,921 * 4/1973 Weidman et al. ................. 343/7 ED
3,952,301 * 4/1976 Sorkin ............................... 343/7 VM
5,161,632 * 11/1992 Asayama ............................... 180/167
5,396,426 * 3/1995 Hibino et al. .................... 364/426.04
5,400,864 * 3/1995 Winner et al. ........................ 180/169
5,529,139 * 6/1996 Kurahashi et al. ................... 180/169
5,574,463 * 11/1996 Shirai et al. ............................ 342/70
5,587,908 * 12/1996 Kajiwara ....................... 364/426.041
5,710,565 * 1/1998 Shirai et al. ............................ 342/70
5,771,007 * 6/1998 Arai et al. ............................. 340/903
5,938,714 * 8/1999 Satonaka ................................ 701/96
5,959,572 * 9/1999 Higashimata et al. ................. 342/70
5,969,640 * 10/1999 Timm et al. .......................... 340/903
6,044,321 * 3/2000 Nakamura et al. ..................... 701/96
6,175,799 * 1/2001 Tsutsumi et al. ...................... 701/96
6,188,950 * 2/2001 Tsutsumi et al. ...................... 701/96

FOREIGN PATENT DOCUMENTS 07-069094 3/1995 (JP) .
11-151950 6/1999 (JP) .

* cited by examiner

Primary Examiner—William A. Cuchlinski, Jr.
Assistant Examiner—Ronnie Mancho
(74) Attorney, Agent, or Firm—Foley & Lardner (57) ABSTRACT

A vehicle follow-up control apparatus includes a distance sensor sensing an actual vehicle-to-vehicle distance from a controlled vehicle to a preceding vehicle, a vehicle speed sensor sensing an actual vehicle speed of the controlled vehicle, and a controller for calculating a desired vehicle speed to be achieved in the controlled vehicle. The desired vehicle speed is calculated in accordance with the actual vehicle-to-vehicle distance, the relative speed and a control gain which is adjusted in accordance with the relative speed.

15 Claims, 6 Drawing Sheets

PRECEDING VEHICLE FOLLOW-UP CONTROL SYSTEM

BACKGROUND OF THE INVENTION

The present invention relates to vehicle follow-up control apparatus and process for recognizing a preceding vehicle ahead, and controlling a distance to the preceding vehicle at a desired distance.

Japanese Patent Kokai Publication No. H7(1995)-69094 shows a conventional vehicle follow-up control system having function of gain adjustment.

SUMMARY OF THE INVENTION

In the conventional gain adjustment, however, the response characteristic is dependent only on the vehicle-to-vehicle distance deviation. Therefore, when the response characteristic is adjusted to a prompt characteristic, the control system might give unnatural feeling to a passenger by decelerating the vehicle the vehicle moderately or sometimes sharply to increase the vehicle-to-vehicle distance in response to intervention, between the controlled vehicle and a preceding vehicle, another vehicle having no relative speed difference.

Moreover, a Japanese Patent Application No. H9(1997)-321402 (Kokai Publication H 1 (1995)-69094 published on Jun. 8, 1999) proposes a related follow-up control system.

In view of the above-mentioned Japanese Patent Kokai Publication No. H7(1995)-69094, and the related art of the Japanese Patent Application No. H9(1997)-321402, it is an object of the present invention to provide vehicle follow-up control apparatus and/or process capable of adjusting a control gain adequately in accordance with a relative speed. It is another object of the present invention to provide vehicle follow-up control apparatus and/or process capable of adjusting a control gain adequately for vehicle speed regions.

According to the present invention, a vehicle follow-up control apparatus for a controlled vehicle, comprises:
- a distance sensor sensing an actual vehicle-to-vehicle distance from the controlled vehicle to a preceding vehicle;
- a vehicle speed sensor sensing an actual vehicle speed of the controlled vehicle; and
- a controller connected with the distance sensor and the vehicle speed sensor, the controller,
  - determining an actual relative speed of the controlled vehicle relative to the preceding vehicle,
  - calculating a desired vehicle speed to bring the actual vehicle-to-vehicle distance closer to a desired distance in accordance with the actual vehicle-to-vehicle distance, the desired distance and the relative speed,
  - calculating a desired driving force to bring the actual vehicle speed closer to the desired vehicle speed,
  - controlling an actual driving/braking force of the controlled vehicle in accordance with the desired driving force, and
  - setting a control gain used in calculation of the desired vehicle speed, in accordance with the relative speed.

According to another aspect of the invention, a vehicle follow-up control apparatus comprises: means for ascertaining a sensed actual vehicle-to-vehicle distance; means for ascertaining a sensed actual vehicle speed; means for determining an actual relative speed; means for calculating a desired vehicle speed in accordance with the actual vehicle-to-vehicle distance, the relative speed and a control gain; means for calculating a desired driving force to bring the actual vehicle speed closer to the desired vehicle speed; controlling an actual driving/braking force of the controlled vehicle in accordance with the desired driving force; and means for varying the control gain in accordance with the relative vehicle speed.

According to still another aspect of the invention, a vehicle follow-up control process comprises: ascertaining a sensed actual vehicle-to-vehicle distance, a sensed actual vehicle speed, and an actual relative speed; calculating a control gain in accordance with the actual relative speed; calculating a desired vehicle speed in accordance with the actual vehicle-to-vehicle distance, the relative speed and the control gain; controlling an actual driving/braking force of the controlled vehicle so as to achieve the desired vehicle speed.

DETAILED DESCRIPTION OF THE INVENTION

Figure 1:
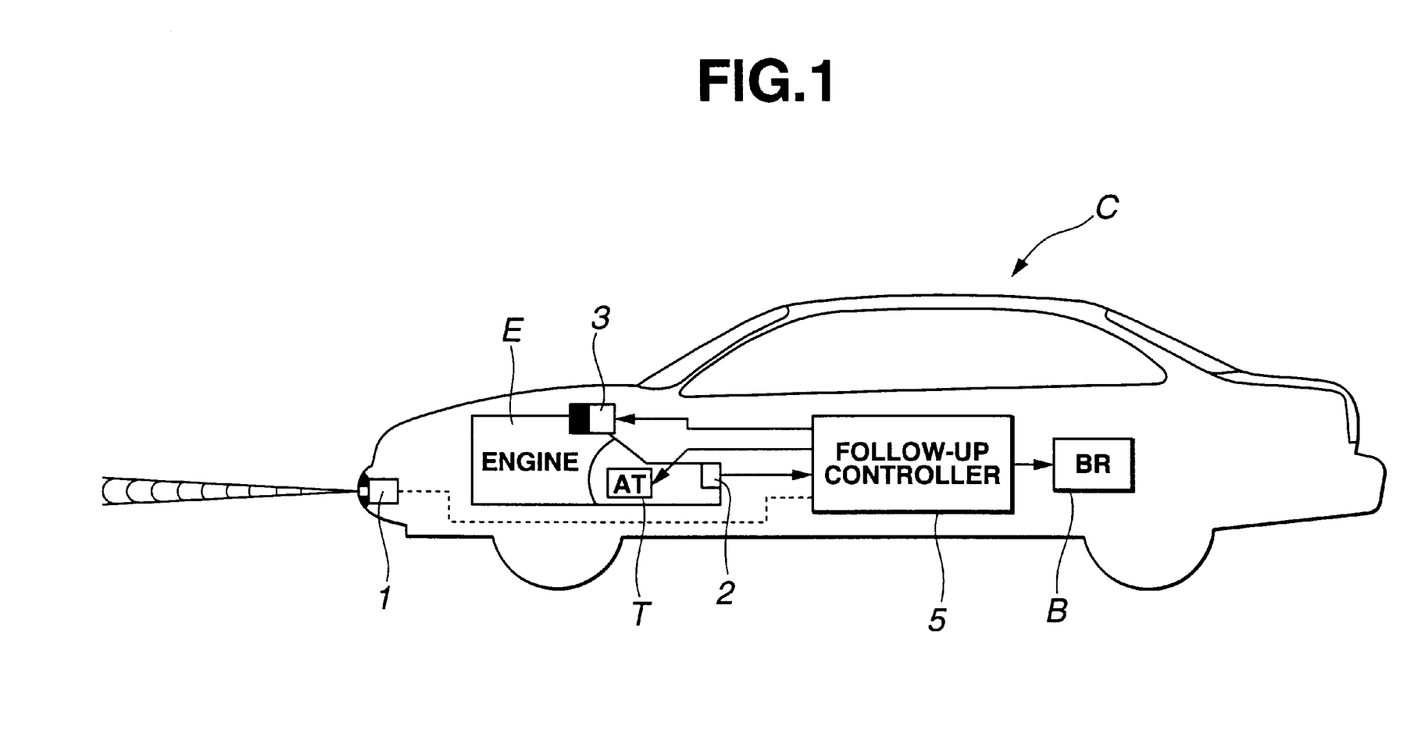
FIG. 1 is a schematic view showing a vehicle equipped with a vehicle follow-up control apparatus according to one embodiment of the present invention.

FIG. 1 shows a vehicle C equipped with a preceding vehicle follow-up control system according to one embodiment of the present invention. The vehicle C equipped with the follow-up control system is hereinafter referred to as controlled vehicle or host vehicle, to distinguish the vehicle under control of this control system from another vehicle.

A distance sensor 1 is provided at the front end of the controlled vehicle C. The distance sensor 1 is a device for measuring a vehicle-into-vehicle distance (or inter-vehicle distance) from the controlled vehicle C to a preceding vehicle, and producing a distance signal representing the measured actual distance L. In this example according to this embodiment, the distance sensor 1 is a radar sensor for transmitting laser light and receiving laser light reflected from a preceding vehicle. Instead of laser light, radio frequency waves and ultrasonic waves are adequate for use in the system for distance measurement.

The controlled vehicle C of this example has an engine E for generating driving torque, an automatic transmission T for transmitting the driving torque to (front and/or rear) drive wheels with a speed ratio controlled in accordance with the vehicle speed and the engine torque, and a brake system B including braking devices individually for the front and rear wheels of the vehicle C.

A vehicle speed sensor 2 is arranged to sense the rotation of the output shaft of the automatic transmission T, and to produce a vehicle speed signal in the form of a pulse train having a period corresponding to the rational speed of the output shaft.

A throttle actuator 3 is an actuator for varying an engine output of the engine E. In this example, the throttle actuator 3 increases and decreases the opening degree of a throttle valve for the engine E in accordance with a throttle valve opening degree signal, and thereby varies the intake air quantity to the engine E to regulate the engine output.

A follow-up controller 5 controls the throttle actuator 3, the automatic transmission T and the brake system B. The follow-up controller 5 receives the distance signal from the distance sensor 1 and the vehicle speed signal from the vehicle speed sensor 2. In accordance with the actual vehicle-to-vehicle distance L sensed by the distance sensor 1 and the actual vehicle speed Vs sensed by the vehicle speed sensor 2, the follow-up controller 5 controls the throttle actuator 3, the automatic transmission T ad the brake system B, and thereby performs a follow-up control to control the controlled vehicle C to follow a preceding vehicle with an adequate distance therebetween.

Figure 2:
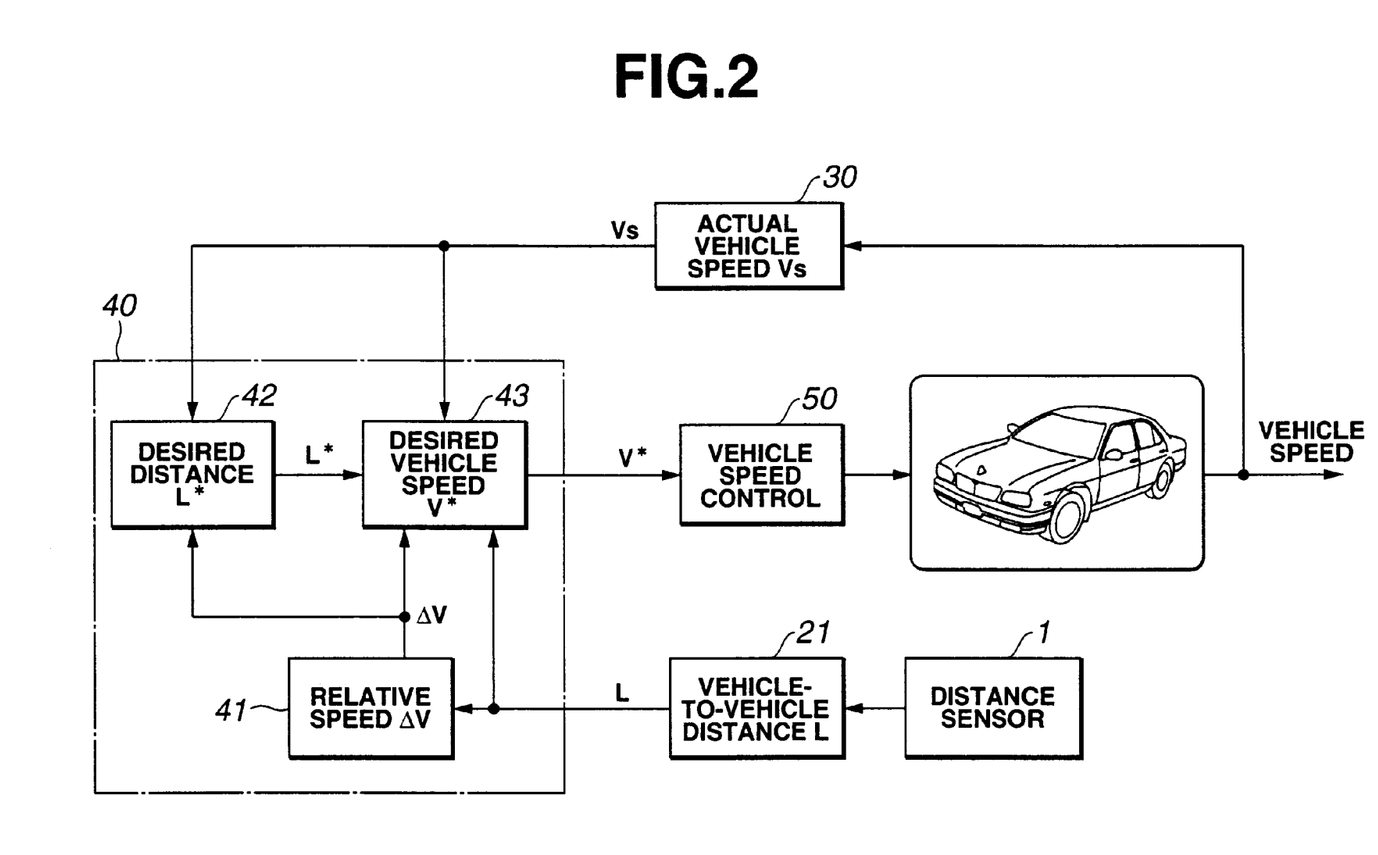
FIG. 2 is a block diagram showing a follow-up controller shown in FIG. 1.

The follow-up controller 5 includes at least one microcomputer and one or more peripheral devices. By means of software in the microcomputer, the follow-up controller 5 is configured to have a control block as shown in FIG. 2.

In the control block, there are provided a distance signal processing section 21, a vehicle speed signal processing section 30, a distance controlling section 40 and a vehicle speed controlling section 50.

The distance signal processing section 21 measures a time interval from transmission of laser beam and reception of reflected beam with the distance sensor 1, and calculates, from the time interval, the actual vehicle-to-vehicle distance L to a preceding vehicle.

The vehicle speed signal processing section 30 measures the period of the vehicle speed signal from the vehicle speed sensor 2, and calculates the actual vehicle speed Vs of the controlled vehicle C.

The distance controlling section 40 receives the distance L from the distance signal processing section 21 and the actual vehicle speed Vs from the vehicle speed signal processing section 30, and calculates a desired vehicle speed V* to hold the actual distance L equal to a desired vehicle-to-vehicle distance L*. The distance controlling section 40 serves as means for controlling a vehicle-to-vehicle distance.

The vehicle speed controlling section 50 controls throttle actuator 3, the automatic transmission T and the brake system B in accordance with the desired vehicle speed V* from the distance controlling section 40 and a relative vehicle speed ΔV, and thereby controls the vehicle speed of the controlled vehicle C so as to make the actual vehicle speed Vs equal to the desired vehicle speed V*. The vehicle speed controlling section 50 serves as means for controlling the vehicle speed.

The distance controlling section 40 of this example includes at least a relative speed calculating subsection 41 for calculating the relative speed ΔV relative to a preceding vehicle in accordance with the distance L inputted from the distance signal processing section 21, a desired distance setting subsection 42 for calculating the desired distance L* from the controlled vehicle C to a preceding vehicle in accordance with the actual vehicle speed Vs of the controlled vehicle C inputted from the vehicle speed signal processing section 30, and a distance control (or desired speed calculating) subsection (or vehicle-to-vehicle distance control calculating section) 43 for calculating the desired vehicle speed V* to reduce a deviation of the actual distance L from the desired distance L* toward zero in accordance with the relative speed ΔV calculated by the relative speed calculating subsection 41 and the desired distance L* calculated by the desired distance setting subsection 42.

The relative speed calculating subsection 41 of this example includes at least a band-pass filter for performing a band-pass filtering operation on the actual distance L inputted from the distance signal processing section 21. This band-pass filter has a transfer function expressed by the following equation (1), in which a derivative term of a Laplace variable (or operator) s appears in the numerator. Therefore, this band-pass filter can calculate an approximate value of the relative speed ΔV by producing an output signal substantially proportional to the derivative or rate of change of the actual distance L.

$$F(s)=\omega c^2 s/(s^2+2\xi\omega cs+\omega c^2) \qquad (1)$$

where $\omega c=2\pi fc$, and s is the Laplace variable.

With the band-pass filter, the relative speed calculating subsection 41 of this example can avoid undesired influence on the vehicle behavior, of noises and uncertainties during the follow-up control as in a system performing a simplified differentiation to determine the relative speed ΔV from a variation per unit time of the actual distance L. The cutoff frequency fc in the equation (1) is determined in accordance with the magnitude of a noise component involved in the distance L, and an allowable level of the short period variation in the longitudinal acceleration of the vehicle body. Instead of the band-pass filter, it is optional to perform the differentiating operation with a high-pass filter for performing a high-pass filter operation on the actual distance L.

The desired distance setting subsection 42 calculates the desired distance L* between the controlled vehicle C and the preceding vehicle according to the following equation (2), from a target vehicle speed Vt (=Vs+ΔV) of the preceding vehicle calculated by addition, to the actual vehicle speed Vs of the controlled vehicle C, of the relative speed ΔV, and a time (vehicle-to-vehicle or inter-vehicle time) To for the controlled vehicle C to reach a position at a distance Lo [m] to the rear of the current position of the preceding vehicle.

$$L^*=Vt \times To+Ls \qquad (2)$$

With the concept of the vehicle-to--vehicle time, the control system increases the vehicle-to-vehicle distance as the vehicle speed increases. In the equation (2), Ls is a stop time vehicle-to-vehicle distance.

The distance control subsection 43 calculates the desired vehicle speed V* required for the controlled vehicle C to follow the preceding vehicle with the actual vehicle distance L being held equal to the desired distance L*, in accordance with the actual distance L, the desired distance L* and the relative speed ΔV. In this practical example, the distance control subsection 43 calculates a desired relative speed ΔV* by a setup, as expressed by the following equation (3), including a linear combination of a product of a distance control gain fd and a distance deviation (L*−L) between the desired distance L and the sensed actual distance L, and a product of a speed control gain fv and the relative speed ΔV, and further calculates the desired vehicle V* by subtracting the desired relative speed ΔV* from the target vehicle speed Vt (=Vs+ΔV), as expressed by the following equation (4):

$$\Delta V^* = fd(L^* - L) + fv \cdot \Delta V \tag{3}$$

$$V^* = Vt - \Delta V^* \tag{4}$$

The distance control gain fd and the speed control gain fv are determined in the following manner.

Figure 3:
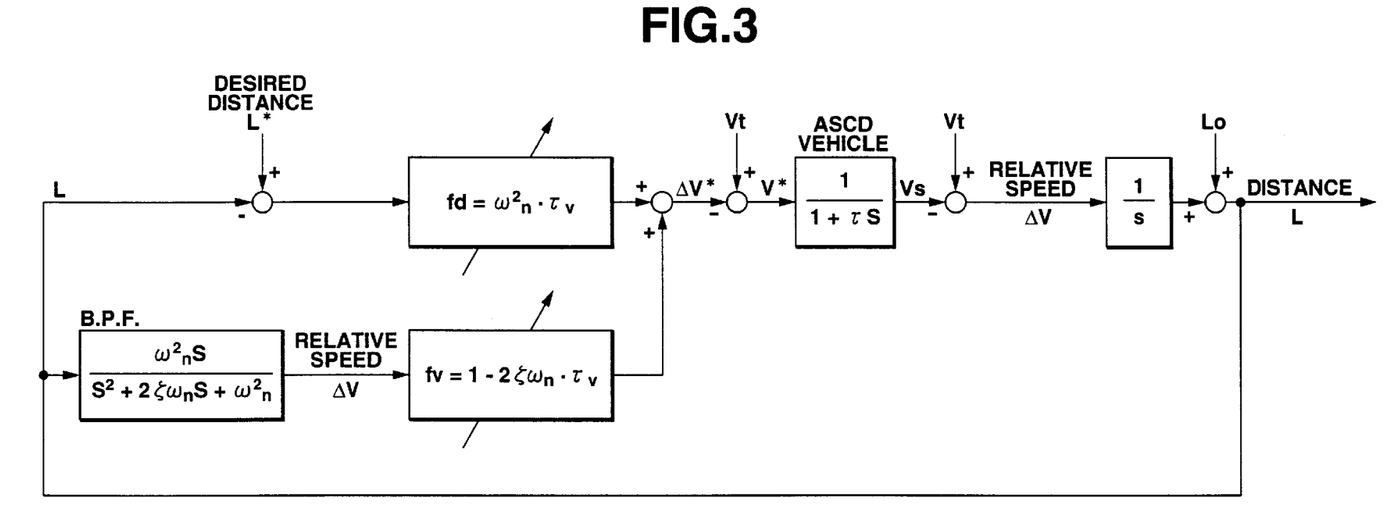
FIG. 3 is a block diagram showing a vehicle-to-vehicle distance control section shown in FIG. 2.

As shown in FIG. 3, this vehicle-to-vehicle distance control system is a one-input, two-output system for controlling two desired values of the vehicle-to-vehicle distance and the relative speed with one input (desired vehicle speed). Therefore, the control system is designed by using a state feedback (regulator).

System state variables x1 and x2 are defined by the following equations (5) and (6)

$$x1 = Vt - Vs \tag{5}$$

$$x2 = L^* - L \tag{6}$$

The control input, that is the output of the follow-up controller 5, is $\Delta V^*$ as defined by the following equation (7).

$$\Delta V^* = Vt - V^* \tag{7}$$

The vehicle-to-vehicle distance L is given by:

$$L = \int (Vt - Vs) dt + Lo \tag{8}$$

where Lo is an initial value of the vehicle-to-vehicle distance L.

In the vehicle speed servo system of this example, the actual vehicle speed Vs of the controlled vehicle C is approximated in the form of a first order lag with respect to the desired vehicle speed V* as follows:

$$Vs = V^* / (1 + \tau_v s) \tag{9}$$

where $\tau_v$ is a time constant.

Assuming that the vehicle speed Vt of the preceding vehicle is constant, the following equations (10) is obtained from the equations (5), (7) and (9).

$$x1' = -x1/\tau_v + \Delta V^*/\tau_v \tag{10}$$

where x1' is the derivative of x1.

Further assuming that the desired distance L* is constant, the following equation (11) is obtained from the equations (6) and (8).

$$x2' = -(Vt - Vs) = -x1 \tag{11}$$

where x2' is the derivative of x2.

Therefore, the state equation of the system is expressed as:

$$\frac{d}{dt}\begin{pmatrix}x1'\\x2'\end{pmatrix} = \begin{pmatrix}-1/\tau, & 0\\-1/\tau, & 0\end{pmatrix}\begin{pmatrix}x1\\x2\end{pmatrix} + \begin{pmatrix}1/\tau\\0\end{pmatrix}\Delta V^* \tag{12}$$

Then, by using the distance control gain fd and the speed control gain fv, the control input u is given by:

$$u = FXF = [fv, fd] \tag{13}$$

The state equation of the entire system with the state feedback is given by:

$$X' = (A + BF)X \tag{14}$$

where X' is the derivative of X.

In the equation (14), by using A' given by:

$$A' = (A + BF) = \begin{pmatrix}(fv-1)/\tau, & fd/\tau\\-1, & 0\end{pmatrix} \tag{15}$$

the characteristic equation of the entire system is obtained as:

$$|sI - A'| = s^2 + \frac{1-fv}{\tau v}s + \frac{fd}{\tau v} = 0 \tag{16}$$

On the basis of the transfer function of the vehicle speed servo system, the vehicle speed control gain fv and the distance control gain fd are set at such respective values as to achieve desired forms of characteristics for controlling the actual vehicle-to-vehicle distance L toward the desired distance L*, and the relative speed $\Delta V$ toward "0".

In the follow-up control system having the state feedback, the control characteristic is approximated in the form of a second order system as expressed by the equation (16). Since the characteristic equation of a system of second order lag is $s^2 + 2\xi\omega_n s + \omega_n^2 = 0$ where $\omega_n$ is a natural frequency and $\xi$ is a damping coefficient, the following equation (17) is obtained from this characteristic equation and the equation (16). From the equation (17), the vehicle speed control gain fv and the distance control gain fd are given by the following equations (18) and (19).

$$s^2 + \frac{1-fv}{\tau_v}s + \frac{fd}{\tau_v} = s^2 + 2\xi\omega_n s + \omega_n^2 = 0 \tag{17}$$

$$fv = 1 - 2\xi\omega_n \cdot \tau_v \tag{18}$$

$$fd = \omega_n^2 \cdot \tau_v \tag{19}$$

In this follow-up control system, the vehicle speed control gain fv and the distance control gain fd can be determined by setting a pole so as to obtain a desired response characteristic.

Table 1 below shows values of the control gains fv and fd obtained from the equations (18) and (19) with the time constant $\tau_v$ of the vehicle speed servo system being set equal to 0.5 sec when (a) the pole of a slower control characteristic is −0.1 (multiple root), and (b) the pole of a faster control characteristic is −0.4 (multiple root).

TABLE 1

| Pole | ωn | § | fv | fd |
|---|---|---|---|---|
| −0.1 | 0.2 | 1.0 | 0.8 | 0.02 |
| −0.4 | 0.4 | 1.0 | 0.6 | 0.08 |

Figure 4:
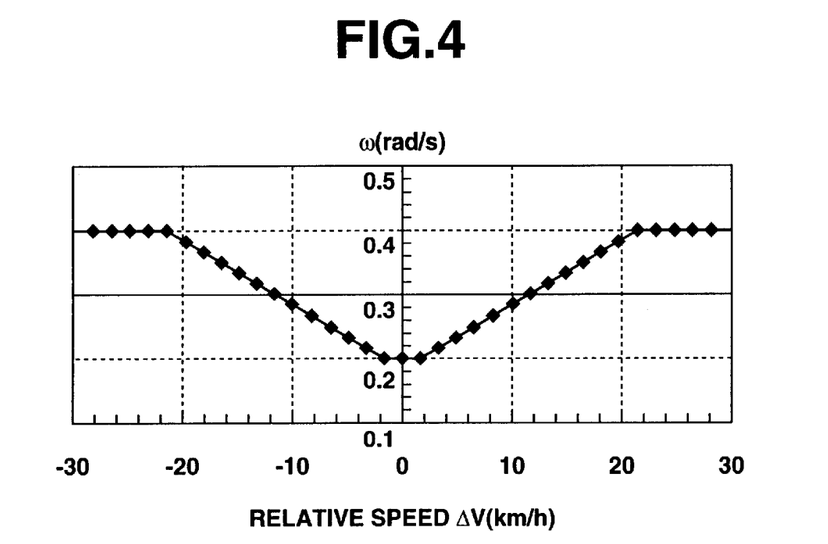
FIG. 4 is a graph showing a reference natural frequency map representing a relationship between a relative speed and a reference natural frequency in a vehicle-to-vehicle distance control calculating section shown in FIG. 2.

Therefore, a frequency calculation map for calculating a reference natural frequency ωL from the relative speed $\Delta V$ is set as shown in FIG. 4. In this map, the poles of the above-mentioned (a) and (b) are used as upper and lower limits, the relative speed $\Delta V$ is expressed along the horizontal axis, and the reference natural frequency ωL is along the vertical axis. In this case, the reference natural frequency ωL is equal to a lower limit value of 0.2 rad/s at $\Delta V = 0$. On each of the positive and negative sides of $\Delta V$, the reference natural frequency ωL increases linearly as the relative speed $\Delta V$ increases in the positive or negative direction from 0 to a predetermined value $\pm \Delta V1$ ($\pm 20$ km/h, for example). Beyond the predetermined value $\pm \Delta V1$, the reference natural frequency ωL is fixed at an upper limit value of 0.4 rad/s.

Figure 5:
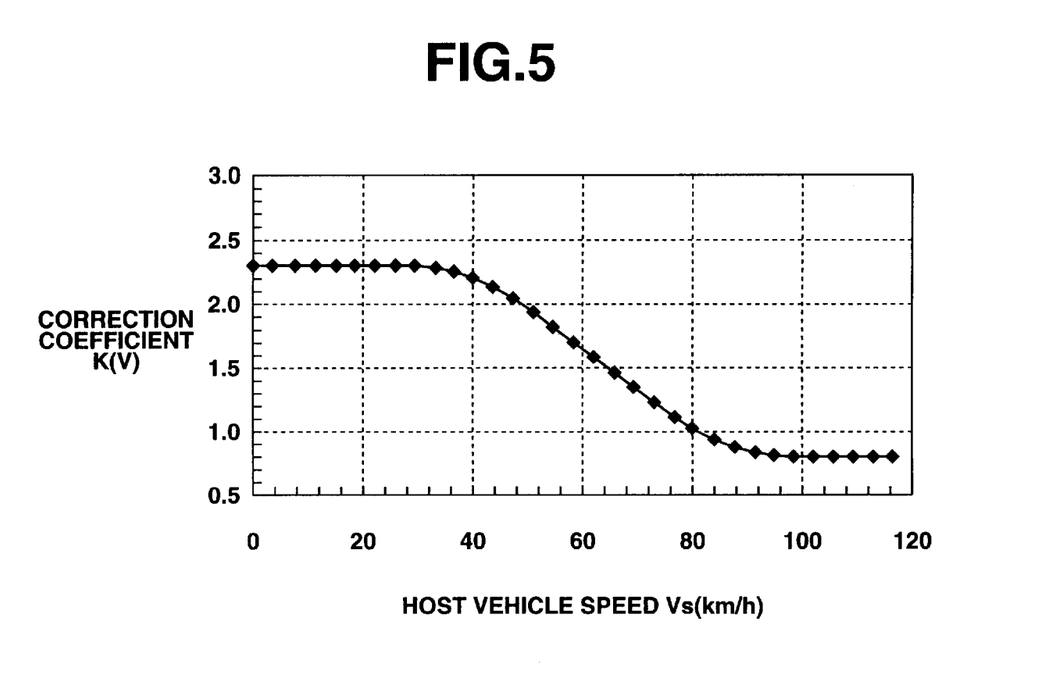
FIG. 5 is a graph showing a correction coefficient map representing a relationship between an actual vehicle speed and a correction coefficient in the vehicle-to-vehicle distance control calculating section shown in FIG. 2.

To modify the response characteristic in dependence on the vehicle speed, a map for calculating a correction coefficient K(v) in accordance with the vehicle speed of the controlled vehicle C is set as shown in FIG. 5. In this map, the correction coefficient K(v) is set about 2.3 in a low vehicle speed region equal to or lower than 40 km/h. In an medium region from 40 km/h to 90 km/h, the correction coefficient K(v) decreases (smoothly and monotonically) with increase in the vehicle speed Vs. The correction coefficient K(v) becomes lower than or equal to 1 beyond 80 km/h, and then remains about 0.8 in a region equal to or higher than 90 km/h.

Figure 6:
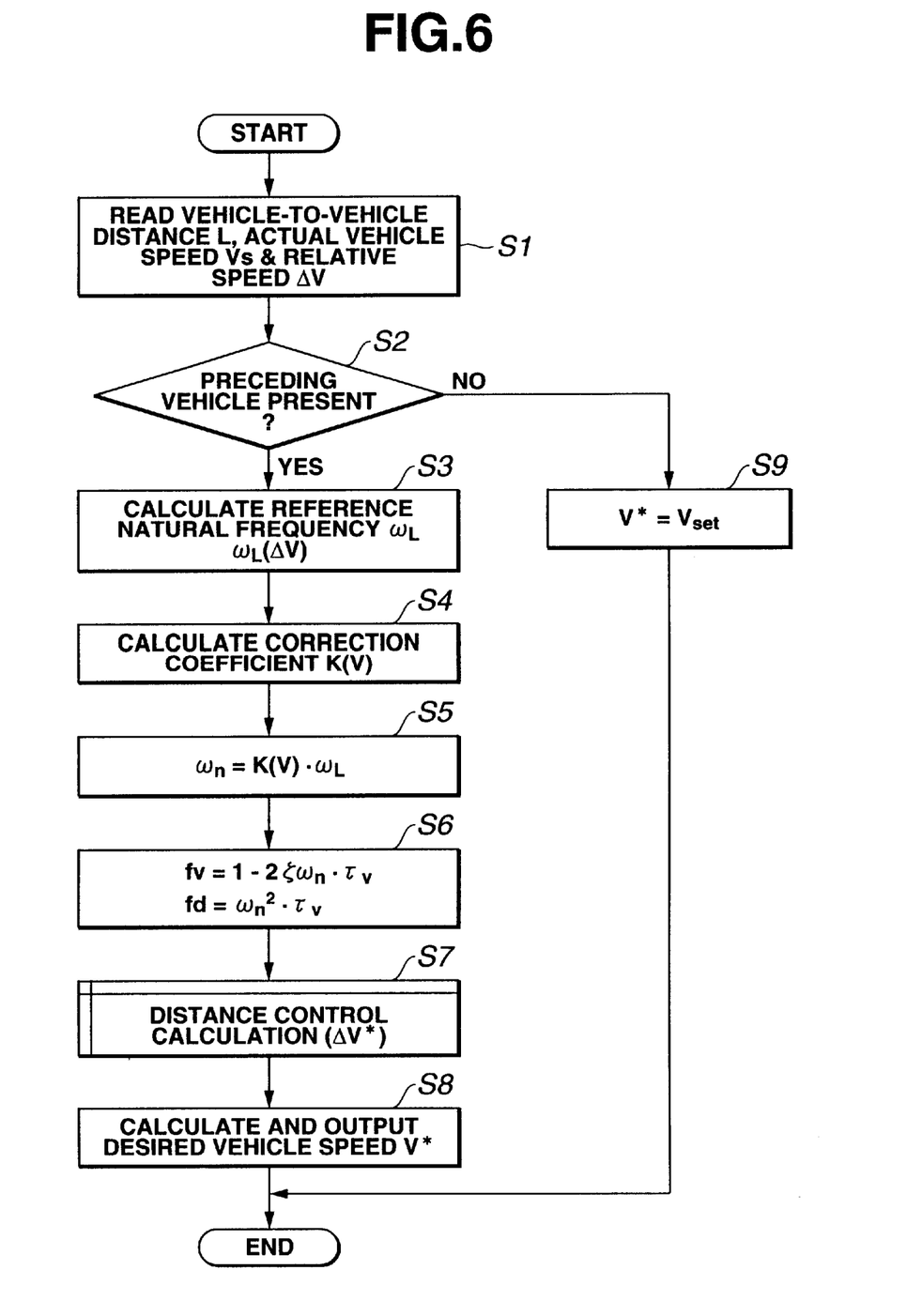
FIG. 6 is a flowchart showing a vehicle-to-vehicle distance control procedure in the vehicle-to-vehicle distance control calculating section of FIG. 2.

The distance control subsection 43 performs a vehicle-to-vehicle distance control procedure shown in FIG. 6. The distance control procedure is performed at regular time intervals (of 10 msec, for example) as a timer interrupt routine.

At a step S1, the controller 5 (the distance control subsection 43 of the controller 5) reads the actual vehicle-to-vehicle distance L, the sensed actual vehicle speed Vs of the controlled vehicle C, and the actual relative vehicle speed ΔV.

At a step S2 following the step S1, the controller 5 determines whether a preceding vehicle is detected, or not. In this example, the controller 5 examines whether the actual distance L obtained at the step S1 is smaller than or equal to a predetermined distance Ls (120 m, for example). When L≦Ls, the controller 5 judges that a preceding vehicle is present, and proceeds from the step S2 to a step S3.

At the step S3, the controller 5 calculates the reference natural frequency ωL from the relative speed ΔV obtained at the step S1, by look-up in the frequency calculating map of FIG. 4.

At a step S4 following the step S3, the controller 5 calculates the correction coefficient (or correction quantity) K(v) from the actual vehicle speed Vs obtained at the step S1, by look-up in the correction coefficient map of FIG. 5.

Then, at a step S5, the controller 5 calculates the natural frequency ωn by multiplication of the reference natural frequency ωL and the correction coefficient K(v), and thereafter proceeds to a step S6.

At the step S6, the controller 5 calculates the vehicle speed control gain fv and the distance control gain fd from the natural frequency ωn calculated at the step S5, by operations of the equations (18) and (19). After the step S6, the controller 5 proceeds to a step S7.

At the step S7, the controller 5 calculates the desired relative speed ΔV* by operation of the equation (3).

Then, at a next step S8, the controller 5 calculates the desired vehicle speed V* by operation of the equation (4), and delivers the calculated desired vehicle speed V* to the vehicle speed control section 50. Then, the controller 5 terminates the timer interrupt routine of FIG. 6, and returns to a main program.

A step S9 is reached from the step S2 when a preceding vehicle is not detected. At the step S9, the controller 5 sets the desired vehicle speed V* equal to a preset speed Vset, and delivers the desired vehicle speed V* to the vehicle speed control section 50. Then, the controller 5 terminates the timer interrupt routine and returns to the main program.

The vehicle speed control sectior 50 includes a vehicle speed servo subsection 51 for calculating a command driving force For to make the actual vehicle speed Vs equal to the input desired vehicle speed V*, and an estimated disturbance dv', and for calculating a desired driving/braking (longitudinal) force F* in the form of a deviation between the command driving force For and the estimated disturbance dv'.

Figure 7:
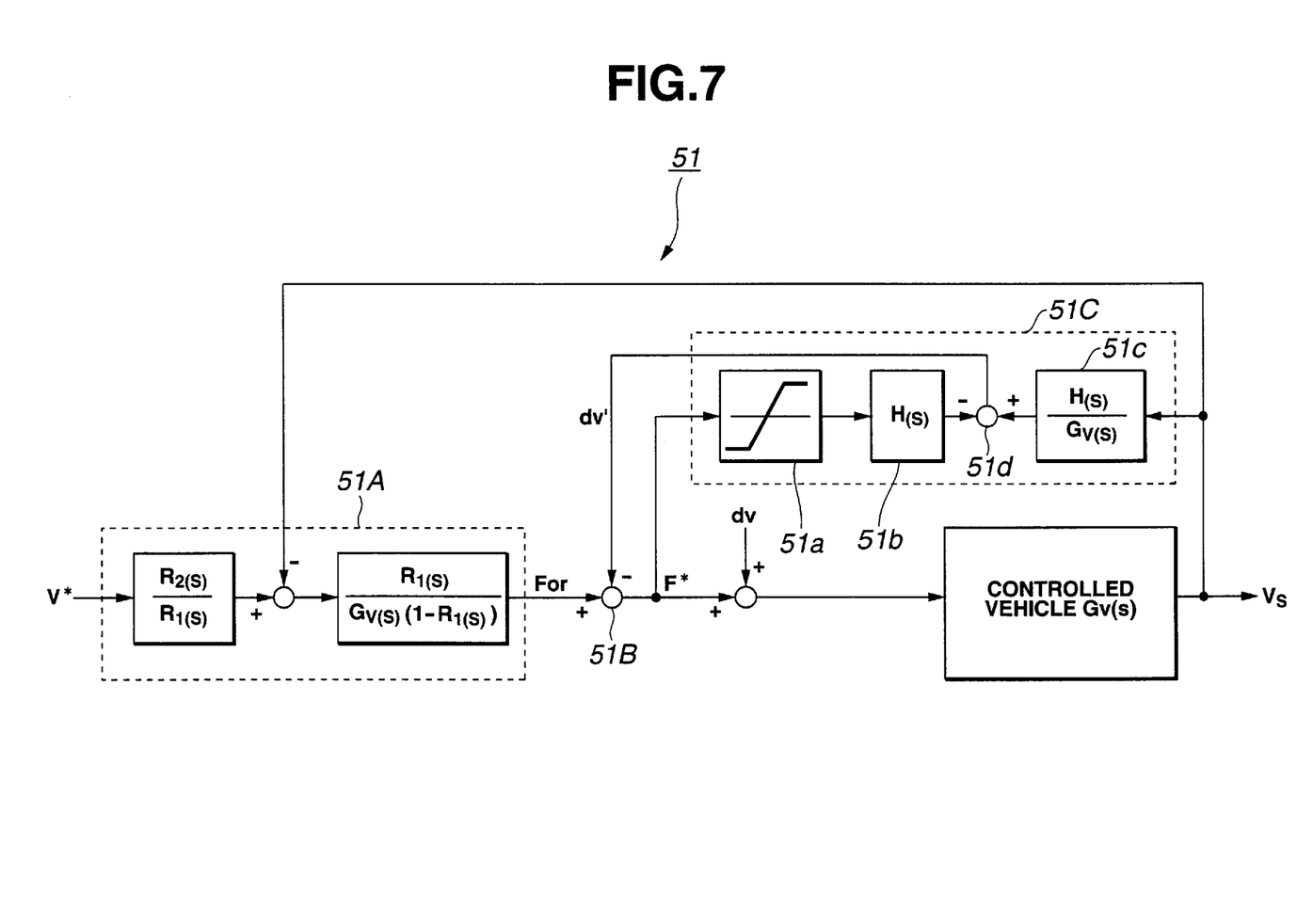
FIG. 7 is a block diagram showing a vehicle speed control section shown in FIG. 2.

The vehicle speed servo subsection 51 as shown in FIG. 7 is a servo system based on a robust model matching technique, and includes a model matching compensator 51A, a subtracter 51B, and a robust compensator 51C. The model matching compensator 51A calculates the command driving/braking force For from the desired vehicle speed V* inputted from the distance control section 40. The subtracter 51B calculates the desired driving/braking force F* by subtracting the estimated disturbance dv' from the command driving/braking force. For calculated by the model matching compensator 51A. The robust compensator 51C calculates the estimated disturbance dv' from the desired driving/braking force F* of the subtracter 51B and the actual vehicle speed Vs of the controlled vehicle C. The desired driving/braking force F* is supplied as a manipulated variable to the controlled vehicle C. The controlled vehicle C is a controlled system (the object to be controlled), and expressed as a mathematical model of a transfer function Gv(s) having the desired driving/braking force F* as manipulated variable and the actual vehicle speed Vs as controlled variable.

The model matching compensator 51A is a compensator for rendering the response characteristic of the vehicle speed servo system equal to a reference model. A reference model R2(s) of a feedforward section is designed to set an input output response characteristic. A reference model R1(s) determines disturbance removing function and stability. The command driving/braking force For is determined from the desired vehicle speed V* and the actual vehicle speed Vs.

The robust compensator 51C includes a driving/braking force limiter 51a, a robust filter 51b, a compensator 51c and a subtracter 51d. The driving/braking force limiter 51a acts to limit the desired driving/braking force F* to a maximum driving force the vehicle can actually produce, and to a maximum braking force the vehicle can actually produce. The robust filter 51b performs a filtering operation H(s) on the output of the driving/braking force limiter 51a. The compensator 51c receives the sensed actual vehicle speed Vs, and determines a driving/braking (longitudinal) force F2 to maintain the current vehicle speed Vs by performing, on the vehicle speed Vs, an operation (H(s)/Gv(s)) of multiplication of the inverse system of the vehicle model and the robust filter. The subtracter 51d subtracts the driving/braking force F1 outputted from the robust filter 51b from the driving/braking force F2 outputted from the compensator 51c. Thus, the subtracter 51d outputs the estimated disturbance dv' including factors such as road surface grade (or slope) and modeling error.

Thus, the vehicle speed servo section 51 of the vehicle speed control section 50 controls the throttle actuator 3, the automatic transmission T and the brake system B in accordance with the desired driving/braking force F* of the subtracter 51B.

The thus-constructed control system is operated as follows:

In the state in which the controlled vehicle C is following a preceding vehicle ahead in an urban area at a vehicle speed lower than or equal to 40 km/h, for example, while maintaining an adequate vehicle-to-vehicle distance to the preceding vehicle running at a constant speed, the actual distance L is held at the desired distance L*, the actual vehicle speed Vs is approximately equal to the target vehicle speed Vt of the preceding vehicle, and the relative speed ΔV calculated by the relative speed calculating section 41 is approximately equal to zero.

In this state, the controller 5 proceeds from the step S2 to the step S3 in the control procedure of FIG. 6 in response to the detection of the preceding vehicle, and determines a value of the reference natural frequency $\omega L$ from the relative speed $\Delta V$ by using the natural frequency map of FIG. 4. The relative speed $\Delta V$ is approximately equal to zero under the above-mentioned assumption, and hence the reference natural frequency $\omega L$ is set equal to a lower limit value of 0.2.

Then, the controller 5 proceeds to the step 54, and determines a value of the correction coefficient K(v) from the sensed actual vehicle speed Vs of the controlled vehicle C by using the correction coefficient map of FIG. 5. The controlled vehicle is running at a speed lower than or equal to 40 km/h. Therefore, the correction coefficient K(v) is set equal to 2.3, and the natural frequency $\omega n$ determined at the step S5 is equal to 0.46. The value is close to the reference natural frequency $\omega L$ in a region in which the relative speed $\Delta V$ is great. As a result, the vehicle speed control gain fv is set equal to 0.54 and the distance control gain fd is equal to 0.106. The value of the speed control gain fv is close to the value in Table 1 obtained when the natural frequency $\omega n$ is equal to the maximum value. The value of the distance control gain fd is greater than the value in Table 1 obtained when the natural frequency $\omega n$ is equal to the maximum value.

Then, at the step S7, the desired relative speed $\Delta V^*$ is determined by the equation (3). The actual distance L is approximately equal to the desired distance $L^*$, and at the same time the actual relative speed $\Delta V$ is approximately equal to zero, as mentioned before. Therefore, the desired relative speed $\Delta V^*$ is set approximately equal to zero, and hence the desired vehicle speed $V^*$ is set equal to the actual vehicle speed Vs by the calculation of the equation (4) in the next step S8. The desired vehicle speed $V^*$ is delivered to the vehicle speed control section 50, which acts to maintain the current value of the actual vehicle speed Vs.

If, from this state, the actual vehicle-to-vehicle distance L decreases sharply because of hard deceleration of the preceding vehicle, or intervention of another vehicle from another lane, then the relative speed $\Delta V$ increases in the negative direction, the reference natural frequency $\omega L$ of the step S3 becomes greater than 0.2, the natural frequency $\omega n$ of the step S5 increases, the speed control gain fv of the step S6 decreases, and the distance control gain fd of the step S6 increases. Moreover, the deviation of the actual distance L from the desired distance $L^*$ increases, the desired relative speed $\Delta V^*$ of the step S7 increases in the positive direction, the desired vehicle speed $V^*$ of the step S8 decreases sharply, and the desired longitudinal (driving/braking) force $F^*$ calculated in the vehicle speed control section 50 in response to the desired vehicle speed $V^*$ is increased in the negative direction. Therefore, the control system brings the throttle valve to the fully closed state with the throttle actuator 2, produces a large braking force with the brake system B, and thereby controls the actual vehicle-to-vehicle distance L to the desired distance $L^*$ promptly by decelerating the controlled vehicle with a high response characteristic.

If the headway vehicle-to-vehicle distance L increases by acceleration of the preceding vehicle or lane change of the controlled vehicle to another lane, then the reference natural frequency $\omega L$ increases, the natural frequency $\omega n$ increases, and the speed and distance control gains fv and fd are varied to the same values as in the deceleration. Therefore, the desired relative speed $\Delta V^*$ of the step S7 increases in the negative direction, the desired vehicle speed $V^*$ of the step S8 increases accordingly, and the control system reduce the deviation of the actual vehicle-to-vehicle distance L from the desired distance $L^*$ promptly by accelerating the controlled vehicle with a high response characteristic.

In a high speed running state on a highway without detection of a preceding vehicle, the controller 5 proceeds from the step S2 to the step S9, and sets the desired vehicle speed $V^*$ equal to a set vehicle speed Vset preset at the beginning of the follow-up control. In response to the set speed Vset as the desired vehicle speed $V^*$, the vehicle speed control section 50 controls the throttle actuator 2 to bring the actual vehicle speed Vs closer to the set vehicle speed Vset as $V^*$.

In a high speed running state on a highway, following a preceding vehicle on the same lane with the distance L to the preceding vehicle being held at the desired distance, the reference natural frequency $\omega L$ of the step S3 becomes equal to the lower limit value of 0.2 because of the relative speed $\Delta V$ being approximately equal to zero, as in the above-mentioned urban running, state. However, the correction coefficient K(v) calculated at the step S4 becomes lower than or equal to one if the vehicle speed is higher than or equal to 80 km/h, for example. Therefore, the natural frequency $\omega n$ of the step S5 becomes approximately equal to a value obtained in Table 1 when the natural frequency $\omega n$ is at a lower limit value. Consequently, the vehicle speed control gain fv becomes slightly greater than the level in the urban running state, and the distance control gain fd is greatly decreased as compared to the urban running state.

In this case, too, the actual vehicle speed Vs is set as the desired vehicle speed $V^*$ in a constant speed running state maintaining the desired distance $L^*$, so that the system can maintain the constant speed follow-up driving. If, however, the actual vehicle-to-vehicle distance L is decreased (or increased) by deceleration (or acceleration) of the preceding vehicle, or intervention of another vehicle from the neighboring lane (or lane changes of the controlled vehicle), then the relative speed $\Delta V$ increases in the negative (or positive) direction, and the reference natural frequency $\omega L$ increases beyond 0.2. However, the correction coefficient K(v) remains about 1, and the natural frequency $\omega n$ is held low. Therefore, the speed control gain fv is increased slightly as compared to the urban running state, and the distance control gain fd is decreased significantly as compared to the urban running state.

Thus, the desired relative speed $\Delta V$ of the step S7 becomes smaller than the level in the urban running state, and the amount of change of the desired vehicle speed $V^*$ from a previous value to a current value calculated at the step S8 is small. In response to the thus-determined desired vehicle speed $V^*$, the vehicle speed control section 50 acts to decrease (or increase) the actual vehicle speed Vs at a relatively gradual rate, and thereby brings the actual distance L closer to the desired distance $L^*$ with a lower response characteristic.

In a medium speed running state in which the vehicle speed is intermediate between the urban running state and the highway running state, the control system sets the correction coefficient K(v) in accordance with such a medium vehicle speed, and thereby adjusts the speed control gain fv and the distance control gain fd adequately in accordance with the vehicle speed.

In this control system according to the illustrated embodiment, the reference natural frequency $\omega L$ is set lower in a low relative speed region in which the relative speed $\Delta V$ is low, and set higher in a high relative speed region in which the relative speed $\Delta V$ is high. Therefore, in a steady state in which the relative speed $\Delta V$ is low and the desired vehicle-to-vehicle distance $L^*$ is maintained, the control system increases the speed control gain fv relatively, and decreases the distance control gain fd greatly, so that the control system responds to changes in the distance to a preceding vehicle in a manner of low response. In a transient state in which the relative speed is increased by sharp acceleration or deceleration of the preceding vehicle, the control system decreases the speed control gain fv slightly and increases the distance control gain fd to bring the distance to the preceding vehicle closer to the desired distance L* promptly with a high response characteristic. Thus, the control system can discern the steady state and the transient state from each other, and thereby provide follow-up control performance adequate to the situation without causing unnatural feeling to the driver.

By adjustment of the correction coefficient K(v) to values greater than one in the low vehicle speed region, and to values smaller than one in the high vehicle speed region, the control system can adapt the response characteristic to the urban driving state and the highway driving state. In the urban driving condition at a relatively low vehicle speed, the distance control gain fd is increased, and the control system can reduce the deviation of the actual distance from the desired distance in a highly responsive manner to meet the driver's tendency toward higher sensitivity. In the high speed region in which the traffic flows with less speed changes as in a highway, the control system sets the distance control gain fd at a small value and thereby lowers the response of the vehicle-to-vehicle distance to meet a driver's tendency to adjust the vehicle-to-vehicle distance gradually. This control system can provide optimum follow-up control performance agreeable to the driver's feeling without regard to the vehicle speed level.

In the example of FIG. 4, the reference natural frequency $\omega L$ increases linearly with increase in the absolute value of the relative speed $\Delta V$ in the region of the relative speed $\Delta V$ from 0 km/h to ±20 km/h. The present invention is not limited to the linear characteristic. The characteristic of the reference natural frequency $\omega L$ may be stepwise to increase or decrease in the form of steps. Similarly, the characteristic of the correction coefficient K(v) is not limited to the form of FIG. 5. The characteristic of the correction coefficient K(v) may be stepwise to increase or decrease in the form of steps in response to changes in the actual vehicle speed Vs in the low speed region and in the high speed region.

Instead of using a map, it is optional to determine the reference natural frequency $\omega L$ and the correction coefficient K(v) by solving equations corresponding to the characteristic curves shown in FIGS. 4 and 5.

In the illustrated example, the vehicle-to-vehicle distance control procedure shown in FIG. 6 is performed in the distance control section 43. The present invention is not limited to this. It is optional to employ a hardware system in the form of an electronic circuit including at least a function generator, a comparator and an operator in combination. Moreover, the follow-up controller 5 in its entirety may be a hardware system.

In the illustrated example, the natural frequency $\omega n$ is determined by multiplying the reference frequency $\omega L$ by the correction coefficient K(v). However, it is optional to employ addition/subtraction for determining the natural frequency $\omega n$ by adding or subtracting the correction coefficient (or correction quantity) K(v) to or from the reference frequency $\omega L$. Furthermore, it is possible to calculate the natural frequency $\omega n$ from the relative speed $\Delta V$ and the actual vehicle speed Vs by the use of a map formed by combining FIG. 4 and FIG. 5. In this combined map, the relative speed $\Delta V$ is expressed along the horizontal axis, the natural frequency $\omega n$ is along the vertical axis, and the vehicle speed Vs is used as a parameter.

In the illustrated example, the controlled vehicle is a rear wheel drive vehicle. However, the present invention is applicable to a front wheel drive vehicle, too. The prime mover is the engine 2 in FIG. 1. However, the controlled vehicle may be an electric vehicle or a hybrid vehicle with both electric and engine systems.

This application is based on a Japanese Patent Application No. 11(1999)-144975. The entire contents of this Japanese Patent Application No. 11(1999)-144975 with a filing date of May 25, 1999 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle follow-up control apparatus for a controlled vehicle, comprising:
   a distance sensor sensing an actual vehicle-to-vehicle distance from the controlled vehicle to a preceding vehicle;
   a vehicle speed sensor sensing an actual vehicle speed of the controlled vehicle; and
   a controller connected with the distance sensor and the vehicle speed sensor, the controller,
      determining an actual relative speed of the controlled vehicle relative to the preceding vehicle,
      calculating a desired vehicle speed to bring the actual vehicle-to-vehicle distance closer to a desired distance in accordance with the actual vehicle-to-vehicle distance, the desired distance and the relative speed,
      calculating a desired driving force to bring the actual vehicle speed closer to the desired vehicle speed,
      controlling an actual driving/braking force of the controlled vehicle in accordance with the desired driving force, and
      setting a control gain used in calculation of the desired vehicle speed, in accordance with the relative speed.

2. The vehicle follow-up control apparatus as claimed in claim 1, wherein the controller calculates the control gain in accordance with a reference natural frequency which increases when an absolute value of the relative speed increases.

3. The vehicle follow-up control apparatus as claimed in claim 2, wherein the controller modifies the reference natural frequency with a correction quantity dependent on the actual vehicle speed.

4. The vehicle follow-up control apparatus as claimed in claim 3, wherein the controller decreases the correction quantity as the actual vehicle speed increases.

5. The vehicle follow-up control apparatus as claimed in claim 1, wherein the controller determines a reference natural frequency in accordance with the relative speed so that the reference natural frequency is higher in a higher relative speed region in which an absolute value of the relative speed is higher than a predetermined level than in a lower relative speed region in which the absolute value of the relative speed is lower than the predetermined level, and calculates the control gain in accordance with the reference natural frequency.

6. The vehicle follow-up control apparatus as claimed in claim 5, wherein the controller determines a correction quantity in accordance with the actual vehicle speed so that the correction quantity is greater in a lower vehicle speed region in which the actual vehicle speed is lower than a predetermined speed level than in a higher vehicle speed region in which the actual vehicle speed is higher than the predetermined speed level, and the controller modifies the reference natural frequency with the correction quantity.

7. The vehicle follow-up control apparatus as claimed in claim 6, wherein the controller determines a modified frequency by multiplying the reference natural frequency by the correction quantity.

8. The vehicle follow-up control apparatus as claimed in claim 1, wherein said control gain is one of a speed control gain and a distance control gain, and the controller calculates the desired vehicle speed from a linear combination of a first term resulting from multiplication by the distance control gain, of a deviation between the actual and desired distances, and a second term resulting from multiplication by the speed control gain, of the actual relative speed.

9. The vehicle follow-up control system as claimed in claim 1, wherein the controller increases the control gain in a manner of monotone nondecreasing function as an absolute value of the relative speed increases.

10. The vehicle follow-up control system as claimed in claim 1, wherein the controller adjusts the control gain in accordance with the relative speed and the vehicle speed.

11. The vehicle follow-up control system as claimed in claim 10, wherein the controller increases the control gain as an absolute value of the relative speed increases, and increases the control gain when the vehicle speed decreases.

12. The vehicle follow-up control system as claimed in claim 1, wherein the controller determines a desired relative speed in accordance with a product obtained by multiplying a deviation of the actual vehicle-to-vehicle distance from the desired distance by the control gain, and further determines the desired vehicle speed in accordance with the desired relative speed.

13. The vehicle follow-up control apparatus as claimed in claim 12, wherein the control gain is proportional to the square of a natural frequency, the controller determines the natural frequency by multiplying a reference frequency by a correction coefficient, the reference frequency is increased as an absolute value of the relative speed increases, and the correction coefficient is decreases as the actual vehicle speed increases.

14. A vehicle follow-up control apparatus for a controlled vehicle, comprising:
   means for ascertaining a sensed actual vehicle-to-vehicle distance from the controlled vehicle to a preceding vehicle;
   means for ascertaining a sensed actual vehicle speed of the controlled vehicle;
   means for ascertaining an actual relative speed of the controlled vehicle relative to the preceding vehicle;
   means for calculating a desired vehicle speed to bring the actual vehicle-to-vehicle distance closer to a desired distance in accordance with the actual vehicle-to-vehicle distance, the relative speed and a control gain;
   means for calculating a desired driving force to bring the actual vehicle speed closer to the desired vehicle speed;
   controlling an actual driving/braking force of the controlled vehicle in accordance with the desired driving force; and
   means for varying the control gain in accordance with the relative vehicle speed.

15. A vehicle follow-up control process for a controlled vehicle, comprising:
   ascertaining a sensed actual vehicle-to-vehicle distance from the controlled vehicle to a preceding vehicle, a sensed actual vehicle speed of the controlled vehicle, and an actual relative speed of the controlled vehicle relative to the preceding vehicle;
   calculating a control gain in accordance with the actual relative speed;
   calculating a desired vehicle speed to bring the actual vehicle-to-vehicle distance closer to a desired distance in accordance with the actual vehicle-to-vehicle distance, the relative speed and the control gain; and
   controlling an actual driving/braking force of the controlled vehicle so as to achieve the desired vehicle speed.

* * * * *